United States Patent [19]
Kuramoto et al.

[11] 3,939,483
[45] Feb. 17, 1976

[54] SELF-PROCESSING CAMERA

[75] Inventors: Yoshio Kuramoto, Toyonaka; Hiroshi Ueda, Nara, both of Japan

[73] Assignee: Minolta Camera Kabushiki Kaisha, Osaka, Japan

[22] Filed: Aug. 12, 1974

[21] Appl. No.: 495,963

[30]    Foreign Application Priority Data
   Aug. 15, 1973   Japan.............................. 48-90830
   Aug. 15, 1973   Japan.............................. 48-90831

[52] U.S. Cl.................................. 354/83; 354/87
[51] Int. Cl.²........................................ G03B 17/50
[58] Field of Search............. 354/83, 84, 85, 86, 87

[56]             References Cited
            UNITED STATES PATENTS
3,200,726   8/1965   Land.................................. 354/84

Primary Examiner—Monroe H. Hayes
Attorney, Agent, or Firm—Wolder & Gross

[57]             ABSTRACT

A self-processing camera is adapted to receive a film magazine containing a plurality of film units mounted in a line upon an elongated leader paper and equally spaced therealong. Each of the film units includes an image recording unit consisting of a photosensitive sheet overlying an image receiving sheet and separable therefrom, and a rupturable portion, containing processing fluid, disposed at one side of the image recording unit. The leader paper is folded to dispose the film units in a superposed stack within the film magazine and the latter has a take-up reel to which is secured one end of the leader paper and is adapted to wind thereon a film unit excluding the image recording unit. After exposure of the foremost film unit, the leader paper is wound upon the take-up reel, drawing the exposed film unit between pressure rollers which rupture the portion containing processing fluid and distribute the latter over the exposed film unit to develop the same, whereafter the film unit is separated from the leader paper and discharged from the camera. The camera includes a rotating member which automatically rotates the take-up reel of the magazine at a controlled rate in response to the termination of exposure and also insures that the take-up reel is rotated to a precise extent sufficient to wind the leader paper thereon by a length corresponding to the distance between the leading edge of one film unit and the leading edge of the next film unit.

5 Claims, 5 Drawing Figures

SELF-PROCESSING CAMERA

BACKGROUND OF THE INVENTION

In U.S. Pat. No. 3,636,845, there is shown a self-processing camera adapted to receive a plurality of film units, each consisting of an image recording unit which is composed of an integral, paired image receiving sheet and a photosensitive sheet, a processing-fluid-containing portion disposed on one side of the image recording unit and a trap adapted to retain excess processing fluid therein which film units are attached to a leader paper at a given equal spacing, whereby after exposure of the leading image recording unit, a reel or spool is rotated to wind the leader paper therearound and carry the leading, exposed image recording unit to a position in which its processing-fluid-containing portion is ruptured, so that the processing fluid is supplied to the exposed image recording unit. Thereafter, the image recording unit thus processed is stripped from the leader paper for discharging same to the exterior of the camera to provide a finished print.

The aforementioned self-processing camera of the prior art presents a disadvantage in that since winding of a take-up reel is effected manually or such a take-up means is incomplete in function, a considerable effort is required to confirm whether the image recording unit of the succeeeding film unit is accurately positioned in the exposure station, after winding of the leader paper. In addition, unstable and uncontrolled manual manipulation during winding of the take-up reel results in uneven processing of an image print and possible damage to the film unit, including the image recording unit being processed.

OBJECTS OF THE INVENTION

It is accordingly an object of the present invention to provide a self-processing camera of the aforementioned type in which the camera is provided with automatic winding means which is driven in a stable manner and which is capable of winding the leader paper by a length corresponding to one film unit.

It is another object of the invention to provide a self-processing camera of the type described, in which a drive source, adapted to operate in association with the termination of exposure, drives a rotating member adapted to cooperate with a take-up reel in such a manner that the aforesaid rotating member is rotated at a controlled rotational speed when the leader paper of a length corresponding to one film unit is being wound around the take-up reel.

It is a further object of the present invention to provide a self-processing camera of the type described, in which a rotating member, adapted to operate in association with the take-up reel, is provided with an indexing disk which is adapted to control the accurate positioning of the succeeding unexposed image recording unit in the exposure station when the take-up reel is rotated and, as a result, the processing fluid is supplied to the preceding exposed image recording unit.

These and other objects and features of the present invention will be apparent during the course of the following specification, when taken in conjunction with the accompanying drawings which indicate the preferred embodiments of the invention.

SUMMARY OF THE INVENTION

According to the present invention, there is provided a self-processing camera, in which a plurality of film units each consisting of an image recording unit, a processing-fluid-containing portion disposed on one side of said image recording unit and an excess processing fluid trap are attached to a leader paper along the length thereof and in an equally spaced relation one from the other, with one end of the aforesaid leader paper secured to a take-up reel or spool. After exposure of the leading image recording unit, the take-up reel is rotated, so that the processing fluid is supplied to the exposed image recording unit, after which the image recording unit is stripped from the leader paper and discharged to the exterior of the camera, while the succeeding unexposed image recording unit is positioned in the exposure station of a camera. Said camera is characterized in that a drive source, adapted to rotate the aforesaid take-up reel in one direction in response to the termination of exposure, drives the rotating member so as to wind the leader paper by a length corresponding to one film unit.

According to one aspect of the present invention, the aforesaid drive source is cocked manually by means of a cocking member and is locked in position by means of a locking member which is adapted to release the cocked drive source from its locked condition in response to termination of the exposure due to a shutter being released.

The drive source, which has been thus released from its locked condition, drives a rotating member which is adapted to rotate the take-up reel only in one direction.

According to another aspect of the present invention, the aforesaid rotating member is provided with a governor member for controlling or selectively limiting the rate of rotation of the rotating member.

According to a further aspect of the present invention, there is provided an indexing member for controlling the extent of rotational movement of said rotating member under the force of the aforesaid drive source, thereby controlling the supply of processing fluid to the exposed image recording unit as well as the subsequent discharge of the image recording unit to the exterior of the camera and further winding of a given length of the leader paper for bringing the succeeding unexposed image recording unit to an accurate position for exposure within the camera.

BRIEF DESCRIPTION OF THE DRAWINGS

FIG. 1 and FIG. 2 are perspective views of a film unit magazine as used in the present invention with portions broken away to show therewithin a folded leader paper mounting a plurality of film units which are partially broken away, and wherein FIG. 1 shows an image recording unit positioned in the exposure station, while FIG. 2 shows the condition of the image recording unit as it is transported from the exposure station to the discharge opening of a camera, as the leader paper is wound around the take-up reel;

FIG. 3 and FIG. 4 are perspective views of the essential interior structural portions of a first embodiment of the self-processing camera of the present invention, in which FIG. 3 illustrates the condition of a drive source of a take-up means which is locked, while FIG. 4 shows the condition of the take-up means as it is being driven by the drive source.

DETAILED DESCRIPTION OF THE INVENTION

Figure 1:
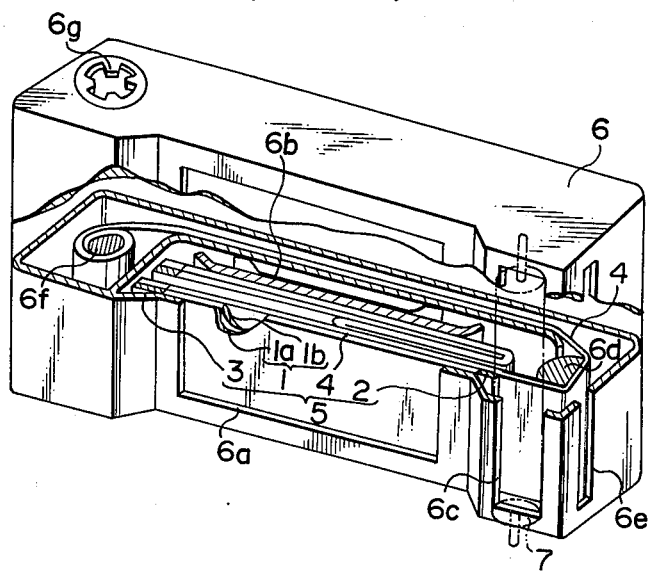
Figure 2:
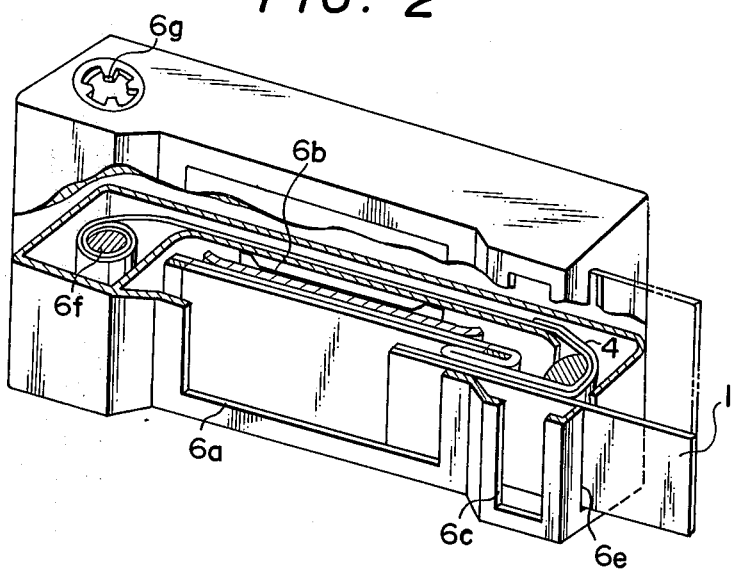

Referring in detail to the drawings, there is shown in FIGS. 1 and 2, a film magazine 6 housing a plurality of film units 5 and constructed for insertion into the interior of a camera.

As shown in FIG. 1, a film unit 5 according to the present invention comprises an image recording unit 1 composed of a photosensitive sheet 1a integrally paired with an image receiving sheet 1b, a rupturable portion 2, which contains processing-fluid, disposed on one side of the image recording unit 1, and a fluid trap 3 for receiving excess processing fluid. Also shown is a leader paper 4, to which are attached image recording units 1, processing-fluid-containing portions 2 and traps 3. A plurality of those film units 5 are disposed linearly in equally spaced relation on leader paper 4. Thus, after exposure, a film unit 5 is transported by the lead paper to cause the rupture of the processing-fluid-containing portion 2, thereby distributing the processing fluid between photosensitive sheet 1a and image receiving sheet 1b for processing, after which only the image recording unit 1 is stripped from the leader paper 4 to obtain a finished print. In this respect, the film units themselves are well known.

In addition, a film magazine 6 as shown in FIG. 1 of the known type in which a plurality of film units are stacked in superposed relation, with leader paper 4 folded to arrange a set of film units 5 in an aligned stack and in such manner that the image recording unit 1 of top film unit 5 faces an exposure frame 6a, and is urged thereagainst by means of a spring 6b. Rotatably mounted in the film magazine is a reel 6f adapted to hold one end of the leader paper 4 and wind the same therearound, whereby the rotation of the reel 6f will transport the exposed film unit 5. In addition, the film magazine is provided with an opening 6c disposed parallel to the exposure frame 6a and housing a pressure roller 7 therein, a receiving member 6d for receiving the aforesaid pressure roller 7, a discharge opening 6e through which is to be discharged an exposed image recording unit 1 which has been subjected to the processing, and a ratchet portion 6g adapted to transmit a rotating force to reel 6f.

Figures 3, 4:
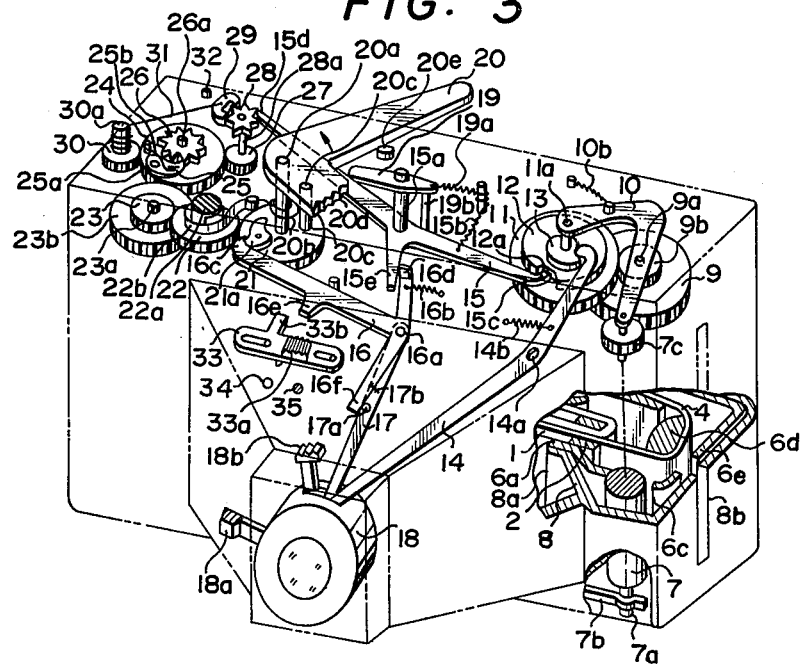

One embodiment of a self-processing camera according to the present invention is illustrated in FIGS. 3 and 4, the camera having a body 8 mounting therein an inserted film magazine 6. The camera body 8 has an exposure station 8a and a discharge opening 8b, which are located in registry with the respective exposure frame 6a and discharge opening 6e of the inserted film magazine 6, while the pressure roller 7 fitted in opening 6c is rotatably journalled on a rotary shaft 7a, while being urged against the receiving portion 6d under the force of a spring 10b acting on a lever 10, as well as the force of a spring 7b acting on the rotary shaft 7a. Rigidly mounted coaxially on rotary shaft 7a is a gear 7c, whereby the rotation of pressure roller 7 is transmitted, by means of a train of reduction gears 9, 9b, 11 meshing with gear 7c, to a shaft 11a of a gear 11. The shaft 9a of gears 9 and 9b is journalled in lever 10 which is rotatably journalled on shaft 11a. As a result, even if the shaft 7a of pressure roller 7 is somewhat deflected when a film unit 5 passes through the gap between the roller 7 and the receiving portion 6d, the proper meshing relationship of the train of gears 9, 9b and 11 will be maintained. Rigidly mounted on shaft 11a are an indexing disk 12 having a locking portion 12a and a cam plate 13 for self-cocking of the shutter. Furthermore, the gear 11 is so designed as to complete one full turn, when the roller 7 is rotated to an extent corresponding to the length of one film unit 5.

Provided in the front of the camera body 8 is a lens shutter assembly 18 having an objective lens disposed with its optical axis at a right angle to the exposure station at its center. The lens shutter assembly 18 includes a shutter release lever 18a and a shutter cocking lever 18b.

A cocking coupling lever 14, is rotatably mounted relative to the camera body by means of a shaft 14a and is biased for counterclockwise rotational movement by a spring 14b. One end of lever 14 is in engagement with the cam plate 13, and its other end engages the shutter cocking lever 18b, such that when the cam plate 13 is rotated by one turn, the cocking coupling lever 14 will reciprocate by advancing in a clockwise direction and returning in the counterclockwise direction. In this respect, cocking coupling lever 14 will operate shutter cocking lever 18b to effect the cocking operation of shutter 18.

A winding-stopping lever 15 has three arms and is rotatably journalled in the camera body by means of a shaft 15a, being imparted a counter-clockwise rotational tendency by means of the spring 15b. When the lever 15 is thus turned in a counter-clockwise direction, a ratchet tooth 15c formed on one arm thereof will engage the indexing disk 12 in its locking portion 12a, while a projection 15d formed on the second arm will engage an escape wheel 28 of a governor to be described later, when the ratchet tooth 15c engages the locking portion 12a, so that the rotation of escape wheel 28 will be interrupted. Furthermore, the third arm 15e engages a lever 16 to be described hereinafter.

A drive gear 22 is rotatably journalled on a shaft 22a in the camera body, while a drive spring 22b, serving as a drive source, is provided between the shaft 22a and the camera body, loading drive gear 22 so as to rotate in a counter-clockwise direction.

A gear 21 meshing with the aforesaid drive gear 22 is loosely fitted on a shaft 20a of a drive source cocking lever 20, with an engaging piece 21a secured to the face of the gear 21.

The drive source cocking lever 20 is spring loaded so as to rotate in a clockwise direction by means of a weak spring 20b which is wound around the shaft 20a, the lever 20 normally abutting a stop member 20e, while a sector-shaped ratchet gear portion 20d having a center at shaft 20a is formed along the edge of an arm of lever 20. Anchored in the undersurface of the lever 20 is a pin 20c which is adapted to engage the locking piece 21a, when gear portion 20d is rotated in a counter-clockwise direction against the action of spring 20b.

A ratchet member 19 engageable with ratchet gear portion 20d is journalled on a shaft 15a of the winding-stopping lever 15, being loaded so as to rotate in the direction toward the shaft 20a under the action of spring 19a. Thus, when drive source cocking lever 20 is in an inoperative position in which it abuts the stop member 20e, the ratchet member 19 is directed toward the shaft 20a to a position in which ratchet member 19 contacts the right hand end of ratchet gear portion 20d.

A coupling pin 19b projects downwardly from ratchet 19, and in said inoperative position, the coupling pin 19b contacts the right hand edge (in the counter-clockwise direction) of the winding-stopping lever 15 which is in the counter-clockwise rotating position.

The locking lever 16 is journalled on a shaft 16a, having three arms, one of which has a ratchet tooth 16c engageable with the engaging piece 21a on gear 21, the second of which has a bent portion 16d engageable with the third arm 15e of winding-stopping lever 15. The lever 16 is loaded by means of a weak spring 16b so as to rotate in a clockwise direction, with the ratchet 16c being engageable with the engaging piece 21a which is in the cocked position. The third arm 16f of locking lever 16 is engageable with a pin 17a on a release lever 17 and a projection 16e engageable with a projection 33b on a release-stopping member 33 to be described hereinafter.

The release lever 17 is rotatably journalled on the shaft 16a of locking lever 16, with a strong spring 17b confined between lever 17 and the arm 16f of locking lever 16, while the tip of lever 17 is engageable with the shutter cocking lever 18b. Thus, when the shutter is released to cause the shutter cocking lever 18b to rotate in a clockwise direction, then the lever 17 will rotate locking lever 16 through the medium of spring 17b against the action of spring 16b as shown in FIG. 4, thereby releasing the engagement of ratchet tooth 16c with engaging piece 21a, whereupon bent portion 16d will rotate the winding-stopping lever 15 in a clockwise direction against the action of spring 15b, thereby releasing the engagement of ratchet tooth 15c with locking portion 12a. At the same time, the projection 15d will be retracted from its engaging position with escape wheel 28, thereby releasing the locked condition of drive gear 22 and freeing it to rotate under action of spring 22b.

An operating gear 24 meshes with a gear 23b which is mounted on a shaft 23a concentrically and integrally with a smaller gear 23, the latter meshing with drive gear 22, so that operative gear 24 is driven by drive gear 22. The operating gear 24 is provided with a pawl 25 journalled on a shaft 25a, the pawl 25 being in engagement with a ratchet wheel 26 rigidly mounted on shaft 26a upon which is loosely mounted the aforesaid operating gear 24. The pawl 25 thus permits the counter-clockwise rotation of the operating gear 24 to be transmitted to ratchet wheel 26, while restraining clockwise rotation of ratchet wheel 26. The shaft 26a of ratchet wheel 26 is formed with a coupling portion (not shown) engaging the ratchet 6g of magazine 6.

The operating gear 24 also meshes with a gear 27 and a gear 30, while escape wheel 28 is mounted on a shaft 28a in integral and coaxial relation to gear 27. An anchor 29, cooperating with escape wheel 28, is mounted on a friction transmitting member 31 wound around shaft 30a of gear 30. Thus, when the operating gear 24 rotates in a counter-clockwise direction to operate ratchet wheel 26, the anchor 29 engages escape wheel 28, acting as a governor. On the other hand, when the operating gear 24 rotates in a clockwise direction, the anchor 29 is moved by member 31 in a counter-clockwise direction until it abuts stop 32, thus retracting from escape wheel 28, and rendering its action as a governor inoperable.

The release-stopping member 33 is slideable on the outer casing of the camera body by means of its guide groove and a guide pin which projects from the outer casing of the camera. The release stopping member 33 has a manipulating piece 33a and a pointer which is to be alinged with a release index 34 and a stop index 35. The projection 33b, formed on the release-stopping member 33, faces the projection 16e on the locking lever 16. Thus, when release-stopping member 33 is set upon the index 34, both the projections 33b and 16e will be disengaged from each other, allowing the clockwise rotation of locking lever 16. On the other hand, when the member 33 is aligned with the stop index 35, both the projections 33b and 16e will be engaged to stop the clockwise rotation of locking lever 16.

With such an arrangement, when the shutter release lever 18a is manually depressed, with the release-stopping member 33 aligned with release index 34 and with the shutter in the cocked condition, then the shutter 18 will be released so as to expose the image recording unit 1 of film unit 5 facing the exposure station 8a. Upon completion of exposure by means of the shutter, shutter-cocking lever 18b will rotate in the clockwise direction to engage release lever 17, thereby rotating locking lever 16, by means of spring 17b, in the counter-clockwise direction, so as to disengage ratchet tooth 16c from locking piece 21a. At this time, bent portion 16d will rotate winding-stopping lever 15 in a clockwise direction, so that projection 15d will be disengaged from escape wheel 28. As a result, the drive gear 22 will drive the operating gear 24 in a counter-clockwise direction, while pawl 25 engages ratchet wheel 26 to thereby rotate the latter in a counter-clockwise direction. Thereupon, anchor 29 will cooperate with escape wheel 28, and the rotation of the operating gear 24 will be controlled or braked to a desired speed by the governor action of escape wheel 28, while reel 6f will wind leader paper 4 therearound. This then causes the exposed film unit 5 to be introduced between pressure roller 7 and its receiving member 6d and, as a result, the processing-fluid-containing portion 2 will be ruptured, so that the processing fluid will be distributed over photosensitive sheet 1a and image receiving sheet 1b by means of roller 7. Thereafter, the image recording unit 1 will be stripped from the leader paper 4 and then introduced through the discharge opening 6e in magazine 6 as well as the discharge opening 8b in a camera body 8, followed by discharge to the exterior of camera body. On the other hand, the excess self-processing materials other than the aforesaid image recording unit 1 will remain on the leader paper 4 and will be wound therewith around reel 6f.

During the aforesaid step, the gear 7c will rotate along with the rotating pressure roller 7, while gear 11 will rotate in a clockwise direction as shown in FIG. 4, together with the indexing disk 12, while the ratchet tooth 15c of winding-stopping lever 15 will engage a portion of indexing disk 12 remote from locking portion 12a, and projection 15d will release the escape wheel 28 from its locked condition. On the other hand, cam plate 13 will rotate to cause cocking-coupling lever 14 to reciprocate in such a manner as to move shutter cocking lever 18b to its shutter-cocking position. The moment that one exposed film unit is shifted and the succeeding film unit comes to a position to face the exposure frame 8a, the indexing disk 12 will rotate to cause ratchet tooth 15c to engage the locking portion 12a, while locking piece 21a, adapted to rotate in the clockwise direction together with disk 12, will abut and engage pin 20c.

Subsequently, when the drive-source-cocking lever 20 is rotated in a counter-clockwise direction, pin 20c will rotate the engaged locking piece 21a in a counter-clockwise direction and cock drive spring 22b, during which time ratchet gear portion 20d will rotate ratchet member 19 in a clockwise direction. On the other hand, coupling pin 19b will rotate winding-stopping lever 15 in a clockwise direction to thereby cause projection 15d to retract from escape wheel 28, releasing gear 21 for rotation. At this time, gear 30 will rotate in a counter-clockwise direction to retract anchor 29 from escape wheel 28, thus rendering the governor inoperative, so that the cocking of the drive spring 22b will be effected rapidly. The reverse movement of the cocking lever 20 during the cocking operation of the aforesaid drive spring 22b is stopped by means of the engagement of ratchet gear portion 20d and ratchet member 19, while the ratchet tooth 16c of locking lever 16 engages locking piece 21a, thus completing the cocking of the drive spring 22b. Then, ratchet gear 20d will be disengaged from ratchet member 19, thus allowing drive-source-cocking lever 20 to return, under tension of spring 20b, to the position in which it abuts stop member 20e, as shown in FIG. 3.

Thereupon the ratchet tooth 15c of winding-stopping lever 15 will engage the locking portion 12a on indexing disk 12, while projection 15d will lock escape wheel 28 against rotation, thus returning to the condition as shown in FIG. 3.

In case exposed image recording unit 1 is not processed immediately after the exposure, as for example, where the exposed image recording unit 1 is to be subjected to a multiple exposure, release-stopping member 33 is manually slid into alignment with stop index 35. Under such a condition, when the shutter is released, the shutter cocking lever 18b will rotate in a clockwise direction to terminate the exposure, and the release lever 17 will be urged in a counter-clockwise direction. However, even if locking lever 16 is urged to rotate in the counter-clockwise direction by means of the spring 17b, projection 16e will engage projection 33b, thereby preventing the rotation of locking lever 16, and spring 17b will be merely expanded, so that the locking will not be released, and no processing of the exposed film unit will be effected. Thereafter, double exposure may be effected by manually moving shutter-cocking lever 18b in a counter-clockwise direction to cock the shutter.

Figure 5:
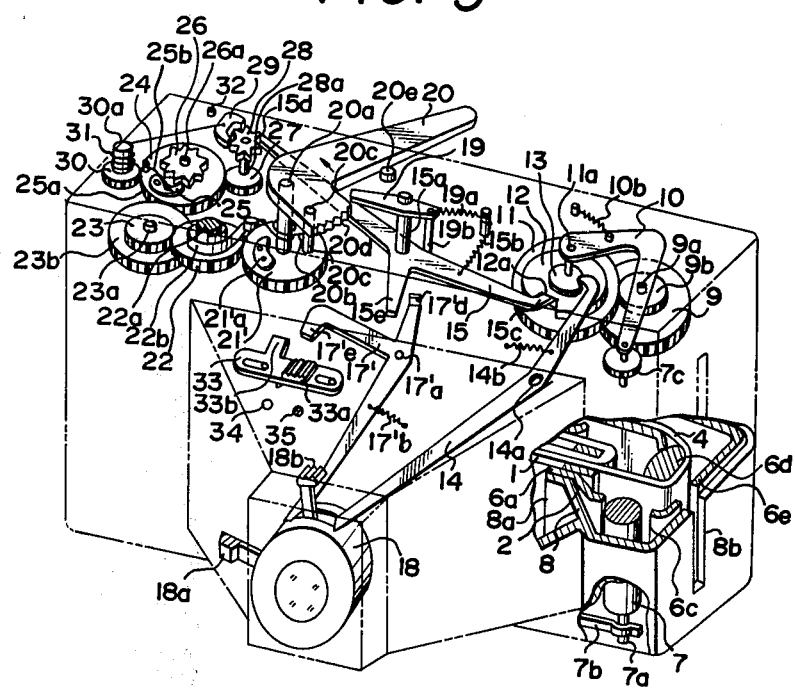
FIG. 5 is a perspective view showing the essential parts of a second embodiment of self-processing camera according to the present invention, showing the condition of the drive source of a take-up means which is locked.

In embodiment shown in FIG. 5, like parts are designated by the same reference numerals as in the previous embodiment. In the embodiment of FIG. 5, the locking lever 16 is eliminated and the locking of the parts under the tension of loaded drive spring 22b is effected, solely by the winding-stopping lever 15, ratchet gear portion 20d and ratchet member 19. In this embodiment, a release lever 17' is rotatably journalled on a shaft 17'a and is biased by a spring 17'b so as to rotate in a counter-clockwise direction, while the end of its arm engages a shutter cocking lever 18b at the side toward which lever 18b is cocked. Furthermore, because of the absence of the locking lever, a drive-source-cocking gear 21' is provided with an interlocking piece 21'a in place of the locking piece 21a. On the other hand, release lever 17' is provided with a projection 17'e facing the projection 33b on release-stopping member 33, and a bent portion 17'd, which is engageable with arm 15e of lever 15, for the purpose of releasing the locked condition due to winding-stopping lever 15, upon completion of the release of a shutter.

Under a condition where the shutter shown in FIG. 5 is cocked, release lever 17' has been rotated in a clockwise direction, by shutter cocking lever 18b, about shaft 17'a against the action of spring 17'b, the bent portion 17'd has been retracted from arm 15e, winding-stopping lever 15 has been rotated in a counter-clockwise direction by means of spring 15b, ratchet tooth 15c has been fitted in the locking portion 12a of indexing disk 12 to thereby stop the rotation of gears 7c and 11, and projection 15d has engaged escape wheel 28 to stop the rotation of drive gear 22 and operating gear 24. Under such a condition, when the shutter is released, shutter-cocking lever 18b will rotate in a clockwise direction, thereby freeing release lever 17' for rotation in a counter-clockwise direction under the action of spring 17'b, and the bent piece 17'd, will engage arm 15e, upon the completion of the exposure of the shutter, to thereby rotate the winding-stopping lever 15 in a clockwise direction. This movement of lever 15 brings its ratchet tooth 15c out of engagement with indexing disk 12 and releases the latter from its locked condition.

In addition, the projection 15d is retracted from escape wheel 28, so that drive gear 22 will commence rotating in a counterclockwise direction by means of drive spring 22b, thus effecting the automatic processing of a film unit as in the previous embodiment. Thus, upon completion of the winding of reel 6f to advance one film unit, the ratchet tooth 15c will again engage locking portion 12a which has completed its one full turn, thereby stopping its rotation, while projection 15d will again engage escape wheel 28 to interrupt its rotation. When the drive-source-cocking lever 20 is rotated in the counter-clockwise direction, the locking condition provided by winding-stopping lever 15 will be released due to the clockwise rotation of ratchet member 19, which causes its mounted coupling pin 19b to rotate the winding-stopping lever 15 in a clockwise direction. The clockwise rotation of gear 21 will be interrupted by means of ratchet gear portion 20d and ratchet member 19, and thus the counter-clockwise rotation of drive gear 22 will also be stopped, with the result that the counter-clockwise rotation of operating gear 24 and ratchet wheel 26 is also prevented and the winding operation of reel 6f will not be effected. When the cocking of drive spring 22b has been completed, and the clockwise rotation of ratchet member 19 by means of ratchet gear portion 20d has been completed, ratchet 19 will be rotated in a counter-clockwise direction by means of spring 19a, while the winding-stopping lever 15 will rotate in a counter-clockwise direction under the action of spring 15b, so that ratchet tooth 15c thereof will again engage locking portion 12a which has been stopped. At the same time, the projection 15d will engage escape wheel 28 to lock same, with drive spring 22b in the cocked condition.

While the described embodiments represent the preferred forms of the present invention, it is to be understood that modifications will occur to those skilled in the art without departing from the spirit of the invention as defined in the appended claims.

We claim:

1. A self processing camera having a shutter and an exposure station and adapted to receive a film magazine containing a plurality of self-processing film units arranged linearly and at equal spacing along a leader paper which is folded to stack said film units in superposed relation, each of said film units comprising an image recording unit, a processing fluid containing portion disposed at one side of said image recording unit, and a trap for excess processing fluid disposed on the other side of said image recording unit, said film magazine having an exposure frame which the top image recording unit is positioned to face, said film magazine also having a rotatable take-up reel to which one end of said leader paper is secured and said film magazine further having a guide member for guiding the leader paper and exposed film units; said self processing camera comprising:

means for mounting said film magazine in said camera with the exposure frame of said magazine in facing relation to the exposure station of said camera;

a rotating member adapted to rotate uni-directionally for rotating the take-up reel of said film magazine to wind said leader paper around said take-up reel in a direction to move the exposed top image recording unit to a developing position at the termination of exposure of the camera shutter;

means including a spring driven member and a drive spring for turning said rotating member;

means for operating said spring driven member in a direction to charge said drive spring;

means for restraining said spring driven member in its spring charged position thereof;

means for releasing said spring driven member from its restrained position in response to the termination of an exposure of the camera shutter to rotate said rotating member;

means for regulating the speed of said rotating member;

a roller rotatably mounted on said camera body and biased relative to the guide member of the film magazine so that said roller is rotated by the movement of the leader paper and the film unit by an amount proportional to the extent of advance of the leader paper through said roller and said guide member;

a cam member rotatable in response to the rotation of said roller;

means for bringing said restraining means to its restraining position when said cam member rotates to an extent which corresponds to the movement of the leader paper to completely discharge an exposed image recording unit.

2. A self-processing camera as set forth in claim 1 further comprising a second cam member rotatable in response to the rotation of said roller and means for cocking the camera shutter with the rotation of said second cam member.

3. A self-processing camera as set forth in claim 1 further comprising a release stopping member mounted for manual movement between first position and second positions, said release stopping member in its first position being adapted to stop said releasing means from releasing said spring driven member from its restrained position in response to said termination of exposure of the camera shutter, said release stopping member in its second position being free of such stopping effect of said releasing means.

4. A self-processing camera as set forth in claim 1, wherein said cam member has a notched indexing portion and comprising a rockable lever including first, second and third lever arms and swingable between first and second positions, said first lever arm being moveable into positions locking and releasing said rotatable member in response to said lever first and second positions, said second lever arm terminating in a follower engaging and disengaging said indexing portion when said lever is in its first and second positions respectively, said releasing means being responsive to the position of said third lever arm at the first position of said lever for actuating said restraining means to its restraining position, and means engaging said third lever arm for swinging said lever to its second position in response to the uncocking of said shutter.

5. A self-processing camera as set forth in claim 4, wherein said speed regulating means includes a ratchet gear rotatable in response to the movement of said spring driven member and further includes a ratchet engageable with said ratchet gear, and said first lever arm of said triple arm lever is engageable with said ratchet gear.

* * * * *